United States Patent [19]

Eckold et al.

[11] Patent Number: 4,483,477
[45] Date of Patent: Nov. 20, 1984

[54] CLAMPING DEVICE FOR TUBES TO BE WELDED TOGETHER

[75] Inventors: Gerd-Jürgen Eckold, St. Andreasberg; Hans Maass, Bad Lauterberg, both of Fed. Rep. of Germany

[73] Assignee: Walter Eckold GmbH & Co., St. Andreasberg, Fed. Rep. of Germany

[21] Appl. No.: 395,475

[22] Filed: Jul. 6, 1982

[51] Int. Cl.³ .............................................. B23K 37/04
[52] U.S. Cl. .................................... 228/42; 228/49 B; 269/48.1
[58] Field of Search ................. 228/49 B, 219, 42; 269/48.1

[56] References Cited

U.S. PATENT DOCUMENTS

| | | | |
|---|---|---|---|
| 2,878,770 | 3/1959 | Work | 228/49 B |
| 3,387,761 | 6/1968 | Pickard | 228/42 |
| 3,434,709 | 3/1969 | Ramsay | 269/48.1 |
| 3,684,149 | 8/1972 | Ambler | 228/49 B |
| 3,742,186 | 6/1973 | Finkel | 269/48.1 |
| 3,750,451 | 8/1973 | Nolan | 269/48.1 |
| 4,084,739 | 4/1978 | Koltz | 228/219 |
| 4,159,072 | 6/1979 | Lajoie | 228/49 B |

FOREIGN PATENT DOCUMENTS 55-94795  7/1980  Japan ................................. 228/49 B

*Primary Examiner*—Kenneth J. Ramsey
*Assistant Examiner*—Marc Hodak

[57] ABSTRACT

Tubular members which are to be joined by establishing a circumferential weld bead at abutting ends thereof are engaged by an internal clamp which defines a circumferential groove aligned with the weld zone. This circumferential groove, which is formed by cooperating surface grooves in a plurality of radially movable jaws, is filled with an inert gas during welding. The action of the jaws insures centering of the tubular members and prevents shrinkage and other misalignment during welding.

13 Claims, 3 Drawing Figures

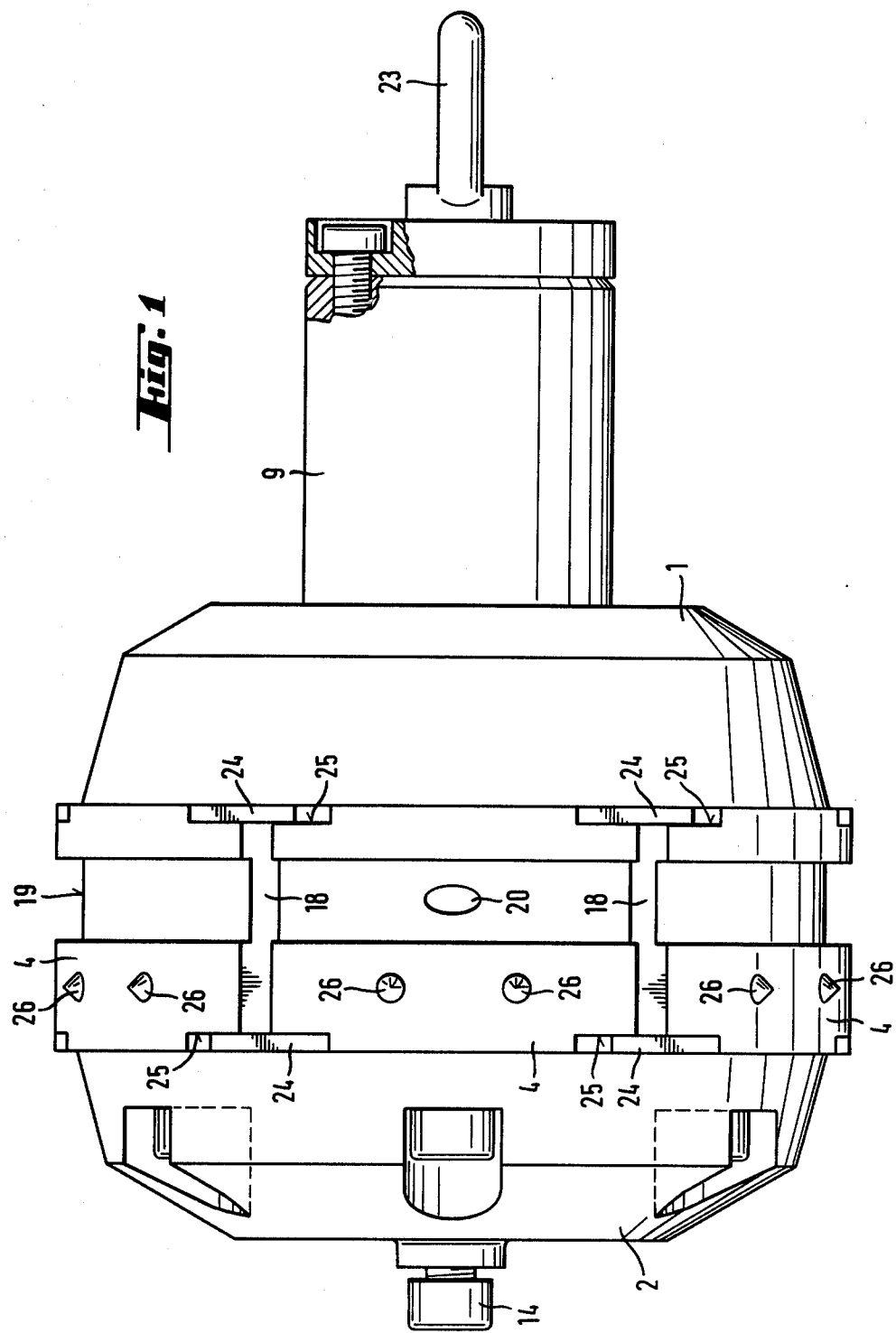

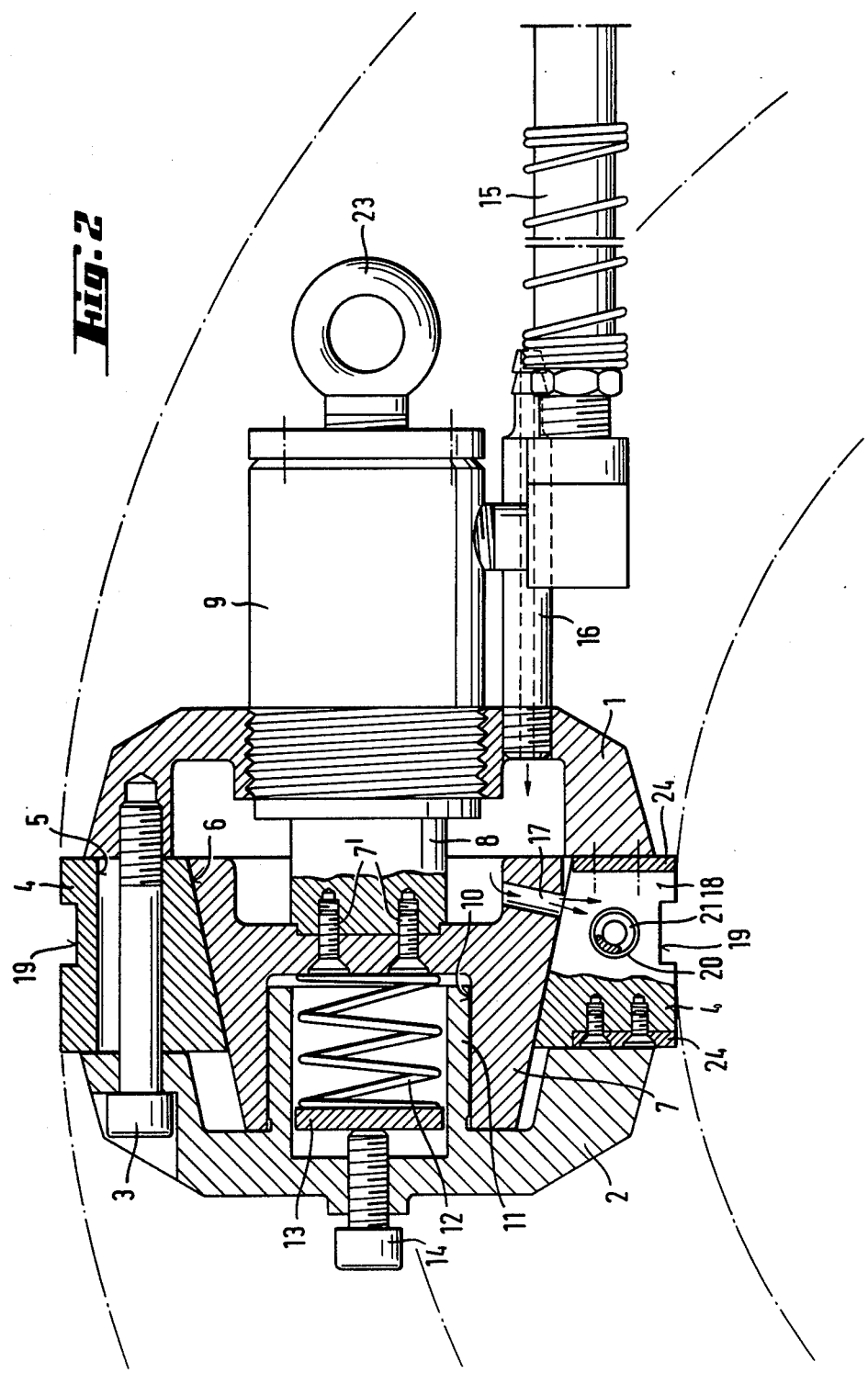

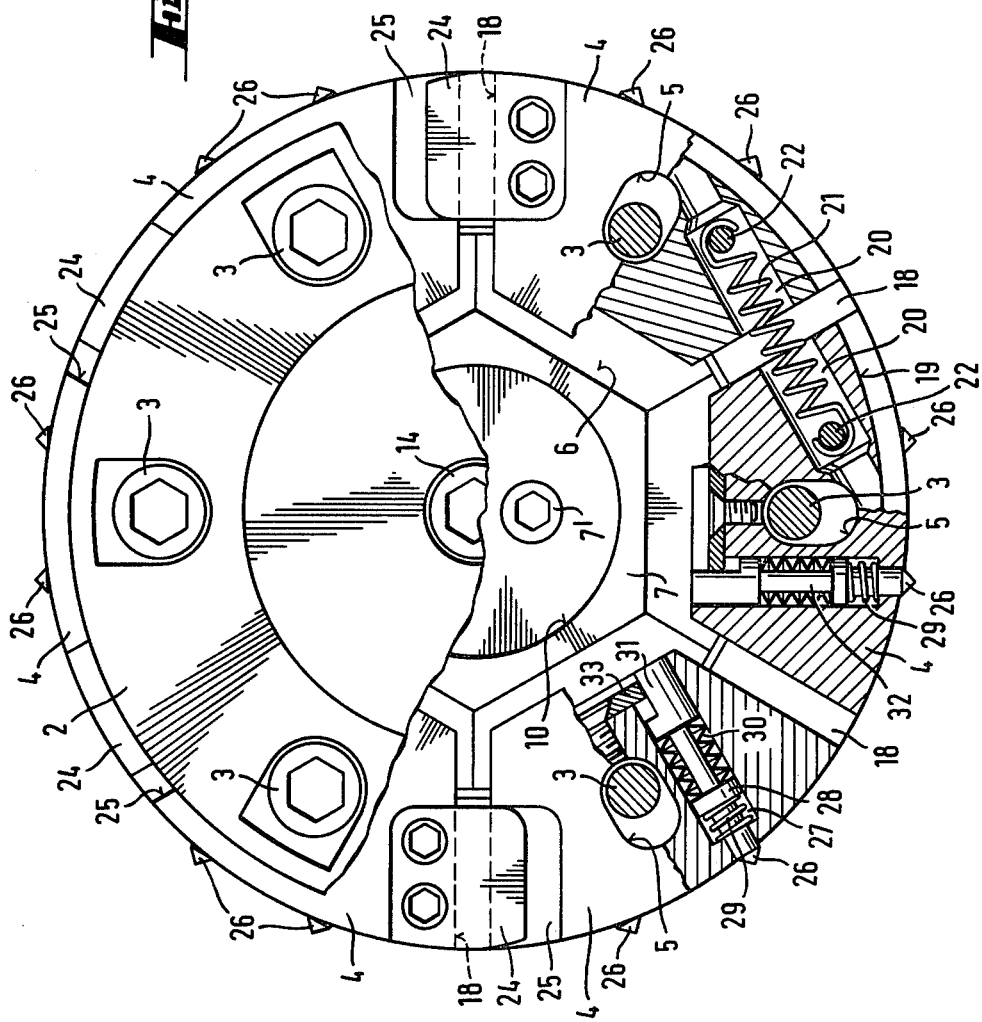

CLAMPING DEVICE FOR TUBES TO BE WELDED TOGETHER

TECHNICAL FIELD

The present invention relates to welding and particularly to the fusion bonding of abutting tubular members wherein the weld region is bathed in an inert gas. More specifically, this invention is directed to clamps for use in welding and especially to clamping devices which facilitate the joining of tubes by means of a circumferential weld bead. Accordingly, the general objects of the present invention are to provide novel and improved methods and devices of such character.

BACKGROUND ART

In the fusion bonding of tubular members to one another it is known to employ external clamping devices which define a circumferential area into which an inert gas may be introduced around the abutting ends of the tubes. For an example of such a prior art clamping device, reference may be had in published German Patent Application Ser. No. 1,959,323. In the case of austenitic steel, however, it is necessary to provide the protective gas atmosphere both outside the tube and also at the inside of the weld bead when tungsten-inert-gas (TIG) welding is employed. Accordingly, when the present external clamping devices are employed, the entire internal volume of the tubes to be welded will be filled with inert gas or special chambers filled with inert gas will be employed. These are both time-consuming procedures and wasteful of the relatively expensive gas.

A further deficiency of prior tube welding devices and procedures is the inability to establish and maintain alignment of the edges of the tube sections which are to be joined. Such misalignment may occur because of tolerances in the production of the tubes, both in diameter and in roundness, and also because of shrinkage of the tubes which occurs during the fusion bonding operation.

DISCLOSURE OF THE INVENTION

The present invention overcomes the above-briefly discussed and other deficiencies and disadvantages of the prior art by providing a novel and improved clamping device and a welding technique which employs the said novel clamping device. Thus, in accordance with the present invention, the alignment of the ends of a pair of tubes to be joined by fusion bonding will be insured and an inert gas atmosphere will be established within the tubes in the weld region. The apparatus and method of the present invention also tend to maintain or promote roundness of the tubes and, in so doing, to counteract any shrinkage which may occur during welding.

Apparatus in accordance with a preferred embodiment of the invention comprises a clamping device including a housing which supports a plurality of movable jaws. These jaws are, under the influence of an actuator which is movable axially with respect to a pair of abutting conduits to be joined, movable so as to define an expandable mandrel. The jaws cooperate to define a circumferential groove and the clamping device is provided with means for delivering an inert gas into this circumferential groove which will lie directly beneath the weld region.

BRIEF DESCRIPTION OF DRAWING

The present invention may be better understood and its numerous objects and advantages will become apparent to those skilled in the art by reference to the accompanying drawing wherein like reference numerals refer to like elements in the various figures and in which:

FIG. 1 is a side-elevation view of a clamping device in accordance with a first embodiment of the invention;

FIG. 2 is an axial cross-sectional view of the apparatus of FIG. 1; and

FIG. 3 is a front-elevation view, partly in section, of the apparatus of FIGS. 1 and 2.

BEST MODE OF CARRYING OUT THE INVENTION

With reference now to the drawing, a clamping device in accordance with the present invention comprises a housing defined by a pair of casing members 1 and 2, the housing having a longitudinal axis. Members 1 and 2 are held together by means of a plurality of bolts 3. The casing members 1 and 2 define a space which receives a plurality of movable clamping jaws 4 having the shape which may best be seen from FIG. 3. The jaws 4 are arranged circumferentially about the housing and are provided with holes 5 through which the bolts 3 pass. The holes 5 are of oblong shape, as may also be seen from FIG. 3, and are oriented such that radial motion of the jaws between a retracted position and the fully extended position of FIG. 2 is possible.

The surfaces 6 of jaws 4 which face inwardly toward the axis of the housing are planar and inclined as may be seen from joint consideration of FIGS. 2 and 3. The faces 6 of jaws 4 contact complementary faces on a drive member 7, member 7 thus having the shape of a hexagonal cone in the disclosed embodiment. Drive member 7 is affixed, by means of screws 7', to the end of a piston rod 8 extending from a fluidic actuator 9. Actuator 9 is affixed to and suspended from casing member 1 and is coaxial therewith. Drive member 7 is provided, at the end facing away from actuator 9, with a blind hole 10 which receives a sleeve-like projection 11 extending inwardly from casing member 2. Sleeve 11 and hole 10 are also coaxial with the clamp housing. The sleeve 11, which is preferably integral with casing member 2, receives a return spring 12 and a disc 13. The position of disc 13 may be adjusted by means of a set screw 14 which extends through casing member 2. Spring 12 extends between disc 13 and the bottom of the blind hole 10 in drive member 7 and thus urges drive member 7 to the right as the apparatus is shown in FIG. 2, motion to the right being commensurate with retraction of jaws 4.

A conduit 15 is provided for the purpose of supplying pressurized operating fluid to the cylinder of actuator 9. A connector 16 extends through casing member 1 and provides a flow path for an inert gas to the interior of the housing. The drive member 7 is provided with passages 17 whereby the protective gas delivered to the interior of the housing may flow outwardly and enter the spaces 18 between the jaws 4. The jaws 4 are provided with aligned grooves 19 in the outer surface thereof, i.e., the surface which contacts the tube sections to be joined. Thus, with the jaws extended to the clamping position as depicted in FIG. 2, a circumferential groove will be defined inside the conduits being welded and in registration with the weld bead. This groove will be filled with the protective gas delivered via connector 16, the space within the clamp housing, the passages 17 and the spaces 18 between adjacent jaws.

As may be seen from FIGS. 2 and 3, the jaws 4 are provided with bores 20. These bores 20 are aligned in adjacent jaws and a return spring 21 is inserted in the facing bores and maintained in position by means of engagement with pins 22. The springs 21 thus span the spaces 18 between adjacent jaws and, in biasing the jaws toward one another, urge the jaws to the retracted position.

The delivery of pressurized fluid via conduit 15 to a first end of the cylinder of actuator 9 will cause the actuator piston to move to the left as the apparatus is shown in FIG. 2 thus moving drive member 7 toward casing member 2. This results in a wedging action, through cooperation between the abutting complementary surfaces on drive member 7 and the jaws 4, whereby the jaws are caused to move radially outwardly. As noted above, the most outward position of jaws 4 is depicted in FIG. 2.

In order to join a pair of tubes, by forming a butt weld at the facing ends thereof, the clamp device of the present invention is inserted into the tubes so that the grooves 19 on jaws 4 are positioned radially inwardly from the contact areas of the tubes where the fusion bond is to be produced. The jaws are then extended by operation of actuator 9 whereby the tubes to be joined will be centered with respect to each other and held in this position during welding. The protective gas is then supplied, via a hose coupled to connector 16, to the region inside of the contact area defined by grooves 19 thus establishing a protective atmosphere inside the welding region.

After the welding is completed the delivery of pressurized operating fluid to actuator 9 via conduit 15 will be terminated and, under the action of the return springs 12 and 21, the jaws 4 will retract. The clamp device may then be pulled out of the tube. An eye 23 is provided on the end of the casing of actuator 9 for this purpose. A rope or chain may be coupled to eye 23. Additionally, if deemed necessary or desirable, the device may be provided with rollers which facilitate movement of the clamp within the tubes.

Referring again to FIGS. 2 and 3, in order to minimize the consumption of the protective gas during welding, each of jaws 4 may, at a first side thereof, be provided a pair of plate extensions 24 and, on the opposite side thereof, a pair of plate receiving recesses 25. The plates 24 on a first jaw are received in the recesses 25 on the adjacent jaw and thus bridge the spaces 18 between adjacent jaws. The provision of the plates 24 and cooperating recesses 25 minimizes the escape of the protective gas into the tubes being welded during the welding operation. It will, of course, be understood that there are other ways in which the loss of the protective gas through the spaces 18 between adjacent jaws 4 may be effected.

The jaws 4 may also be provided with anchoring pins 26 which are received in bores 27, the bores 27 being longitudinally offset with respect to the surface grooves 19. The anchoring pins 26 are provided with collars 28 against which springs 29 and 30 react. The springs 29 have a relatively low spring rate and extend between an internal shoulders in bores 27 and the collars 28. The springs 30 have a relatively high spring rate and extend between collars 28 support members 31 which slide on the drive member 7. In a preferred embodiment a pair of pins 26, which have pointed ends facing outwardly from the tube contacting surface of the jaws, are provided on each of jaws 4. The drive member 7 is provided with additional wedge surfaces, not shown, which have a greater angle than those of the surfaces which cooperate with the surface 6 of jaws 4. These additional wedge surfaces contact the support members 31 and cause the pins 26 to initially be moved outwardly further than jaws 4. Accordingly, the clamping device may be brought into a first provisional clamping position with a first of the tubes to be welded, the actuator 9 being in a partially operated condition at this time. In this partially operated condition the clamping device is held concentrically within the first tube by the pins 26. The second tube will then be moved into an abutting position relative to the first tube and actuator 9 further operated to extend jaws 4 to clamp both tubes adjacent their abutting ends so that the welding can take place. The springs 30 allow the retraction of the pins 26 during the final clamping of the abutting tubes and thus insure that the pins 26 do not penetrate the interior wall of the first tube. The springs 29 function merely as return springs.

The support members 31 each include a pin-like extension 32 which may be engaged in a recess in the cooperating collar 28. The springs 30, in a preferred embodiment, comprise a set of cup springs through which the extensions 32 pass. In the retracted position the movement of the support body 31 is limited by cooperation between a shoulder thereon and a stop 33.

It will be understood that, rather than employ a fluidic actuator 9, other means for driving member 7 may be employed such as, for example, an electric motor or a mechanical drive. The drive member 7 may have any axially symmetrical outer surface with the jaws 4 having a complementary surface such that radial motion may be imparted to the jaws by the drive member. By way of example, the drive member 7 may define a true conical surface and be driven by a worm drive shaft.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Clamping apparatus for use in the joining of tubular members by fusion bonding comprising:
    means defining a housing, said housing having an axis;
    a plurality of jaws, said jaws being positioned in said housing means for limited radial movement relative to said housing means axis, said jaws each having a recess extending across the surface thereof which faces outwardly with respect to said axis, said recesses being aligned and cooperating to define an annular groove having an open side;
    means for imparting radial movement to said jaws whereby said jaws may be extended into a clamping relationship with the interior surfaces of a pair of abutting tubular members with said annular groove in registration with the joint between the tubular members;
    a plurality of resiliently biased anchoring pins, said pins being extendable outwardly with respect to said housing means to contact the wall of a first of the tubular members, said pins supporting the clamping apparatus in the first tubular member prior to engagement of the tubular members by said jaws; and means for delivering a protective gas to said annular groove.

2. The apparatus of claim 1 further comprising:

means responsive to the said movement imparting means for extending said anchoring pins.

3. The apparatus of claim 2 wherein said jaws also each having oppositely disposed sides and wherein said apparatus further comprises:

fluid dam means mounted on the sides of at least some of said jaws, the fluid dam means affixed to a first of said jaws overlapping a side of an adjacent jaw and covering the space between the facing surfaces of adjacent jaws whereby leakage of the protective gas from the gaps between adjacent jaws is minimized.

4. The apparatus of claim 3 wherein said protective gas delivering means comprises:

connector means for establishing fluid communication between the interior of said housing means and a source of protective gas; and at least a first passage in said movement imparting means, said passage providing fluid communication between the interior of said housing means and the space between a pair of adjacent of said jaws whereby a protective gas delivered through said connector means will flow through said housing means, said passage and the space between said jaws to said annular groove.

5. The apparatus of claim 4 wherein said movement imparting means comprises:

a drive member positioned in said housing means, said drive member having plural wedge surfaces which respectively contact a complementary surface on one of said jaws; and means for causing axial motion of said drive member, said axial motion of said drive member producing radial motion of said jaws through wedging action.

6. Clamping apparatus for use in the joining of tubular members by fusion bonding comprising:

means defining a housing, said housing having an axis;

a plurality of jaws, said jaws being positioned in said housing means for limited radial movement relative to said housing means axis, said jaws each having a recess extending across the surface thereof which faces outwardly with respect to said axis, said recesses being aligned and cooperating to define an annular groove having an open side;

a tapered drive member positioned in said housing means, said drive member contacting complementary drive surfaces on said jaws;

means for imparting axial motion to said drive member, axial motion of said drive member producing simultaneous radial motion of said jaws through wedging action whereby said jaws may be extended into a clamping relationship with the interior surfaces of a pair of abutting tubular members with said annular groove in registration with the joint between the tubular members;

at least a first passage in said drive member, said drive member passage providing fluid communication between the interior of said housing means and the space between a pair of adjacent of said jaws; and connector means for establishing fluid communication between the interior of said housing means and a source of protective gas whereby a protective gas may be supplied to said annular groove through said connector means, said housing means, said drive member passage and the space between said jaws.

7. The apparatus of claim 6 wherein said drive member in part has the shape of a polygonal cone and wherein said jaws are provided with planar surfaces which are complementary to the surfaces of said cone.

8. The apparatus of claim 6 wherein said axial motion imparting means comprises:

a cylinder, said cylinder having a piston therein and a piston rod extending therefrom;

means for delivering a pressurized fluid to the interior of said cylinder at one side of the piston therein; and means coupling said piston rod to said drive member.

9. The apparatus of claim 6 wherein said jaws also each have oppositely disposed sides and wherein said apparatus further comprises:

fluid dam means mounted on the sides of at least some of said jaws, said fluid dam means on a first of said jaws overlapping a side of an adjacent jaw and covering the space between the adjacent jaws whereby leakage of the protective gas from the gaps between adjacent jaws is minimized.

10. The apparatus of claim 9 wherein said dam means each comprise:

a plate affixed to and extending from a jaw; and a pair of plate receiving recesses in the sides of adjacent jaws.

11. Clamping apparatus for use in the joining of tubular members by fusion bonding comprising:

means defining a housing, said housing having an axis;

a plurality of jaws, said jaws being positioned in said housing means for limited radial movement relative to said housing means axis, said jaws each having a recess extending across the surface thereof which faces outwardly with respect to said axis, said recesses being aligned and cooperating to define a discontinuous annular groove having an open side, said jaws also each having oppositely facing sides, said jaws further each having an inwardly facing drive surface;

a drive member positioned in said housing means, said driving member having surfaces which are complementary in shape to and in contact with said drive surfaces of said jaws;

means for imparting motion to said drive member, motion of said drive member producing simultaneous radial motion of said jaws whereby said jaws may be extended into a clamping relationship with the interior surfaces of a pair of abutting tubular members with said annular groove in registration with the joint between the tubular members;

means for delivering a protective gas to said annular groove; and fluid dam means mounted on the sides of at least some of said jaws, said fluid dam means on a first of said jaws overlapping the side of an adjacent jaw and covering the space between the adjacent jaws whereby leakage of the protective gas via the gaps between adjacent extended jaws is minimized, and wherein said dam means each comprise a plate affixed to and extending from a first jaw, and a pair of plate receiving recesses in the sides of adjacent jaws, said plate being secured to a first jaw in the said recess and extending into the said recess in an adjacent jaw.

12. The apparatus of claim 11 wherein said drive member in part has the shape of a polygonal cone and wherein said drive surfaces of said jaws are planar and complementary in shape to the surfaces of said cone.

13. The apparatus of claim 12 wherein said motion imparting means comprises:
 a cylinder, said cylinder having a piston therein and a piston rod extending therefrom;
 means for delivering a pressurized fluid to the interior of said cylinder at one side of the piston therein; and
 means coupling said piston rod to said drive member.

* * * * *